Dec. 28, 1965  R. M. BECKER  3,226,273
METHOD AND APPARATUS FOR MAKING REINFORCED
PLASTIC TUBING
Filed Oct. 13, 1960  2 Sheets-Sheet 1
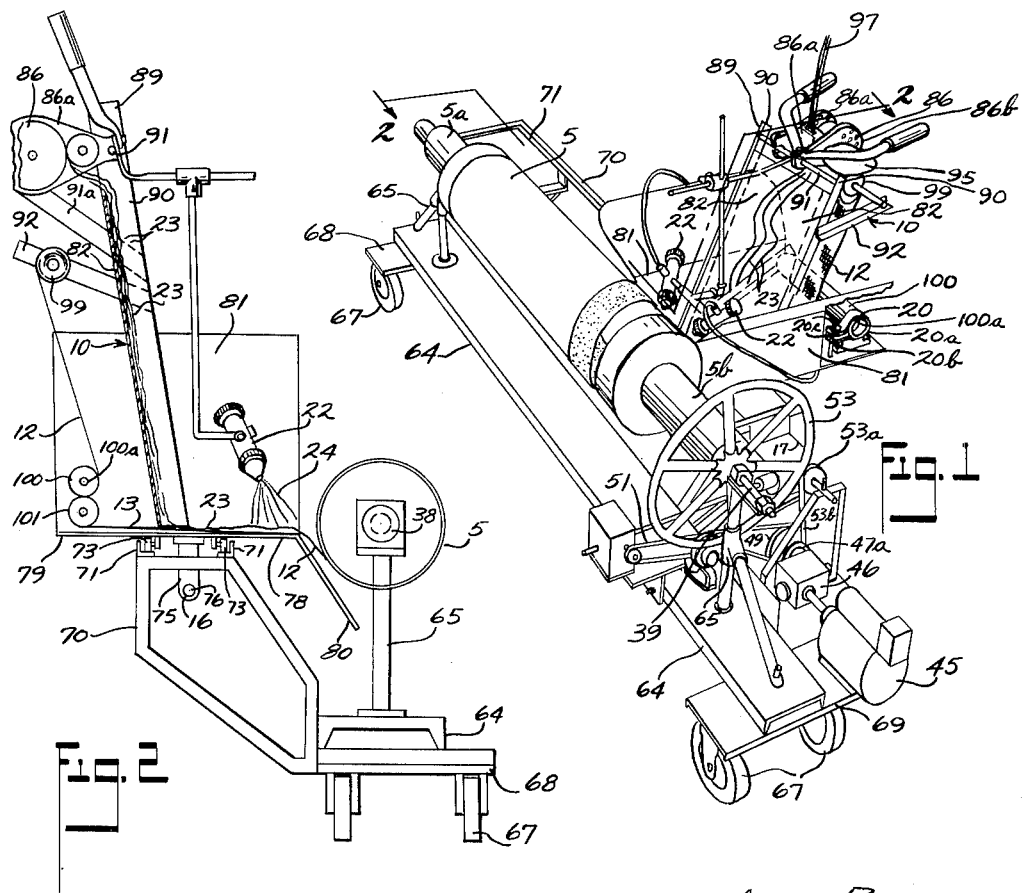
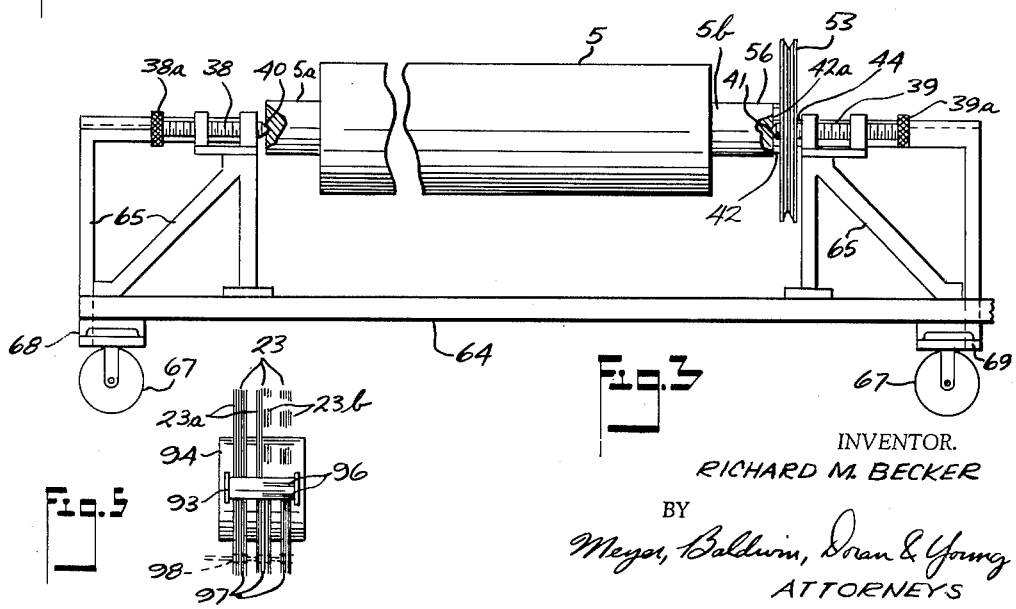
INVENTOR.
RICHARD M. BECKER
BY
Meyer, Baldwin, Doran & Young
ATTORNEYS

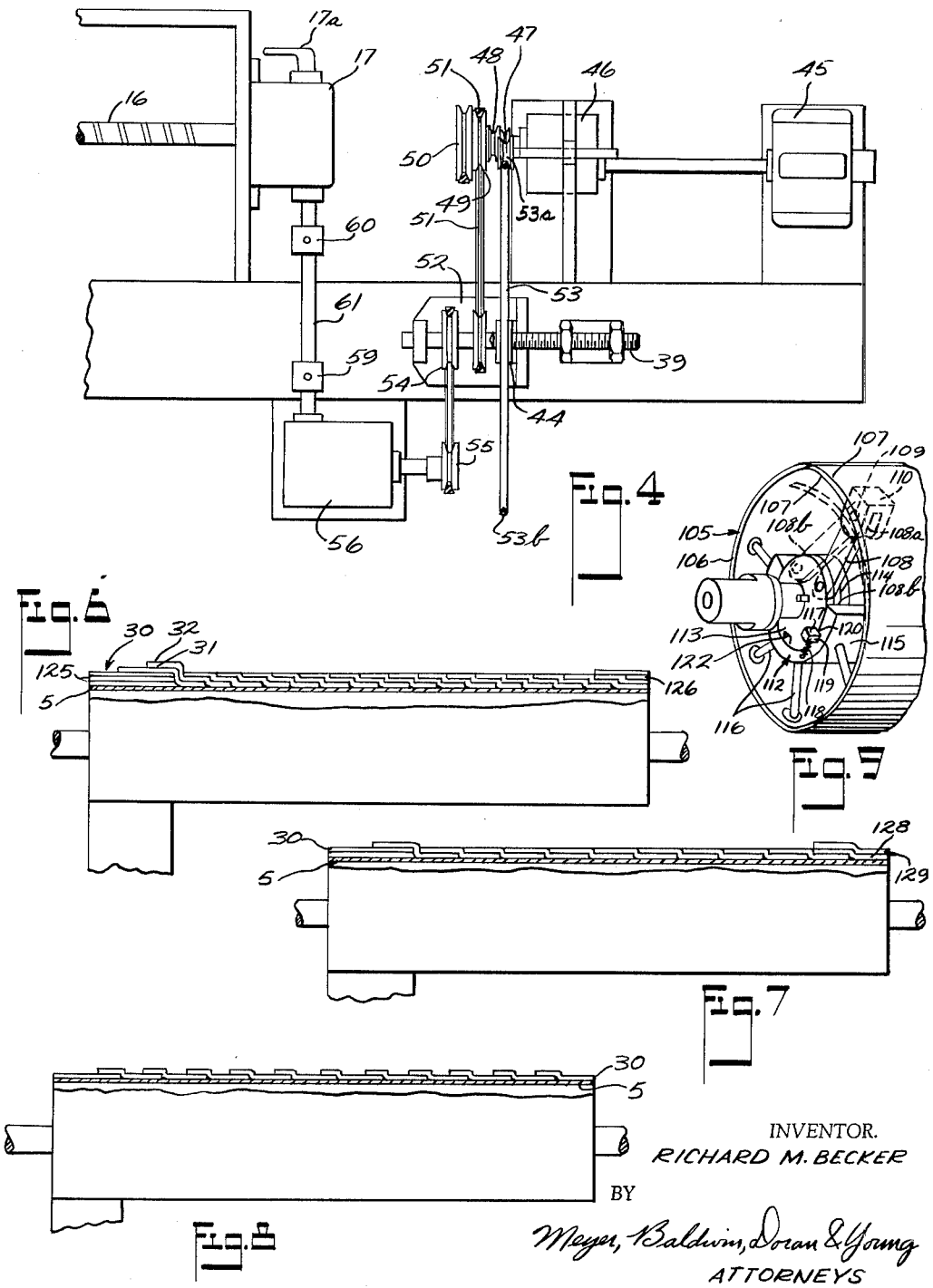

3,226,273
METHOD AND APPARATUS FOR MAKING REINFORCED PLASTIC TUBING
Richard M. Becker, Willoughby, Ohio, assignor, by mesne assignments, to Ibis Enterprises Limited, Hamilton, Bermuda, a body corporate of Bermuda
Filed Oct. 13, 1960, Ser. No. 62,464
6 Claims. (Cl. 156—195)

The present invention is directed to apparatus and a method for depositing a mixture of filler and plastic binder material on a rotating cylindrical member and hardening the mixture thereon to provide a hard outer marginal surface thereover. In the present invention, the above described outer surface can be deposited upon the worn surface of a cylindrical roller or the like and then ground down to provide a re-surfaced cylindrical member. Also, the cylindrical member may be a collapsible mandrel which can be quickly collapsed and removed after a composite layer has been deposited according to this invention to provide a hollow tubular member suitable for use as reinforced plastic tubing.

It is an object of the present invention to provide a method of forming an outer layer on a mandrel comprising the steps of progressively wrapping a belt around and along said mandrel and simultaneously applying on said belt, between it and said mandrel, a combination of a solidifiable plastic material and a filler.

It is an object of the present invention to provide a method of forming an outer layer on a mandrel comprising the steps of progressively wrapping a porous belt of woven cloth around and along a mandrel while continuously applying between said mandrel and said belt a mixture of a settable synthetic resin and a fibrous filler material.

It is an object of the present invention to provide a generally elongated cylindrical member having a radially outer skin portion comprising an outer annular belt member which is impregnated with a solidified plastic binding material and a radially inner annular marginal portion adjacent said skin portion comprising the solidified plastic binding material and a filler material dispersed therein.

It is an object to provide a novel generally elongated cylindrical member having a hollow interior and a wall formed from a filler material and a solidified plastic binding material.

It is an object of the present invention to provide a method of resurfacing a cylindrical member such as a roller to thereby provide the same with a hard, tough, abrasion-resistant surface.

It is an object of the present invention to provide a method of forming a hard, tough, annular, elongated tubular member by depositing a filler and a liquid plastic binder therefor on a belt, wrapping the belt around a rotating cylindrical member, placing a drag on the belt for tight wrapping of the cylindrical member and squeezing the plastic binder onto and around the filler, and solidifying the binder to form the hard tubular member around the outer marginal surface of the cylindrical member.

It is an object of the present invention to provide a method of forming rigid, annular, elongated, reinforced, plastic tubing by depositing a filler and a liquid plastic binder therefor on a tension belt, wrapping said belt tightly around a collapsible member to squeeze the binder to remove air bubbles and voids and to thoroughly wet and develop the filler, solidifying said binder to form a rigid plastic sleeve over the mandrel, and thereafter collapsing the mandrel to release the rigid plastic tubing.

It is an object of the present invention to provide an apparatus for resurfacing cylindrical members or making tubing by depositing a filler and liquid plastic binder on a plastic impregnatable belt, wrapping the belt tightly around a rotating cylinder, and hardening the binder to provide a hard, generally annular covering of said hardened binder and filler over the cylinder.

These and other objects will be apparent from the following specification, the appended claims, and the drawings in which:

FIG. 1 is a perspective view of an apparatus embodying the present invention and suitable for forming a cylindrical surface;

FIG. 2 is a fragmentary vertical end elevational view of the apparatus shown in FIG. 1 along the line 2—2 indicated in FIG. 1 and, particularly, illustrates the deposit of liquid solidifiable plastic material and a filler on a tension belt member;

FIG. 3 is a fragmentary side elevational view of the cylindrical member and its supporting structure with parts broken away and shown in section;

FIG. 4 is a fragmentary plan view of the apparatus shown at the nearer end of FIG. 1 and showing in particular the means of rotating the cylindrical member and driving the carriage longitudinally thereof;

FIG. 5 illustrates schematically a means of depositing filler material on the belt, the filler being glass fiber either in the form of roving or chopped fibers depending upon the choice of the operator;

FIG. 6 is a fragmentary elevational view of the cylindrical member which has been wrapped with three layers of the plastic binder and filler material deposited on the tension belt with parts broken away and shown in section;

FIG. 7 illustrates a wrapped cylinder member similar to that shown in FIG. 6 except that it has been wrapped with two layers instead of three;

FIG. 8 illustrates a cylindrical member which has been wrapped with one layer;

FIG. 9 illustrates a collapsible mandrel which can be wrapped with layers of filler-plastic binder material and then withdrawn from the hardened wrapped layers to leave a rigid, tough, tube.

The present invention provides a quick and economical method of forming an outer layer on a cylindrical member to surface or resurface the same, or to make hollow tubing, the improved method comprising the steps of progressively wrapping a belt around and along a cylindrical member and continuously applying between that member and the belt a mixture of a solidifiable plastic material and a filler.

The present invention also includes an apparatus for practicing the above described method, and referring to the drawings, comprises a rotating cylindrical member 5, a carriage 10 having a flexible tension belt member 12 which has a substantially horizontal run 13, means for wrapping said cylindrical member 5 with said belt member 12 including moving means, such as a lead screw 16 and clutch member 17, for moving the carriage progressively longitudinally of the cylinder member, and means including a brake 20 for placing a drag on the belt 12 for tightly wrapping the cylinder 5. There is also provided, on the carriage 10, means including feeder or cutter 86 and chute 82 for depositing a filler material 23 and other means such as spray gun 22 for depositing a solidifiable plastic binder material 24 on the belt member 12.

It should be noted that the brake means 20 for placing a drag on belt 12, as illustrated by the preferred embodiment shown in the drawings, provides tension on the belt 12 to squeeze and saturate the laminate formed around the outer surface of cylinder 5 to eliminate any air bubbles and to avoid formation of any pockets that might otherwise be formed if the belt member were loosely wrapped around the cylinder member 5.

Thus, the present invention provides, using the above designated apparatus, a quick economical method of providing a novel outer surface for a cylinder, rollers and the like or to resurface a cylinder to a desired outside dimension, the method comprising the steps of (1) depositing the flowable plastic binder 24 and filler material 23 on the belt 12 having the horizontal run 13 and operatively attached to the carriage 10, (2) placing a drag on the tension belt 12 for tight wrapping of cylindrical member 5, (3) wrapping the cylindrical member 5 with the belt 12 to form an outer marginal sleeve member 30 comprising an inner layer 31 of the above mentioned filler material 23 and plastic binder 24 and an outer surface layer 32 comprising the belt 12 of material incorporated into and preferably impregnated with the plastic binder material, and (4) hardening the plastic binder to form the solid outer shell layer 30 over the cylindrical member 5.

Going into the further details of the construction of the apparatus, the method used, and the resurfaced cylindrical article formed thereby, the cylinder 5 is rotatably mounted between adjusting screw or center pin 38 and center pin 39, the pin 38 being the rear spindle pin and the pin 39 being the forward spindle pin.

The cylinder 5 has stub shafts 5a and 5b, each stub shaft having centered, horizontally aligned, coned recesses 40 and 41 which are adapted for receiving the points of the center pins 38 and 39. The cylinder is rotated by a dog 42 connected to a face plate 42a, the dog having a tail piece, not shown, that engages drive shaft or hub 44. The drive shaft 44 and the lead screw 16 for the carriage etc. are all driven from a common power source, namely a motor 45 which operates a driving system as best seen in FIG. 4. As therein shown, motor 45 drives a speed reducer 46 which, in turn, rotates and connects to a rotating pulley drive shaft 47 having pulleys 48, 49 and 50 mounted thereon. A belt 51 is provided for pulleys 48, 49 and 50 and can be operatively engaged around either pulley 48 or 50 to drive a variable speed selector 52. In the embodiment shown in the drawings, the variable speed selector 52 is driven by pulley 49. However, if a different speed is desired, the selector 52 can be driven from pulley 48 or pulley 50.

Pulley 47a is provided on shaft 47 and is used to rotate a large driving pulley 53, the pulley 53 being rigidly mounted on the drive shaft 44. Also, an idler roll 53a is used to provide tension on belt 53b which is mounted between pulleys 47a and 53. Selector 52, through pulleys 54 and 55, in turn, drives a speed reducer 56, the reducer 56 being operatively connected to the clutch 17 through a drive means including shear pins 59 and 60 and drive shaft 61. The clutch 17 is operatively connected to the lead screw 16, which moves the carriage 10 in forward direction. A handle 17a is provided on clutch 17 and has three positions, namely, forward, reverse and idle. The carriage shown here is returned by moving handle 17a from its forward position (shown in FIG. 4) to its reverse position.

The cylinder 5 is mounted on a channel-shaped frame member or beam 64 having upright end supports 65 near each end thereof and horizontally aligned for rotatably supporting the cylinder 5 in a generally horizontal position parallel to and above the frame member 64. The spindle or center pins 38 and 39 are adjustably mounted on the end supports 65, the distance between the end points of the pins being adjustable. The pins 38 and 39 have heads 38a and 39a, and are threaded for easy rotation in and out of their respective end supports to move the pins closer together or farther apart.

The variable speed selector 52 is used to control the lead screw travel and the speed of rotation of the cylinder 5 so that various diameters of cylinder 5 and various widths of belt 12 can be used—the helical angle of the wrapping being determinable in advance for desired thickness of the applied layers of filler and plastic binder. The frame member 64 might be stationary, but is here shown mounted on wheels 67 for mobility and easy moving of the unit into a desired work area, the wheels being mounted on end plates 68 and 69, one end plate being provided on each end of the beam 64.

The carriage 10 travels longitudinally of the cylinder 5 in a path generally parallel thereto. As best seen in FIG. 2, an upper carriage support frame 70 is rigidly attached to the frame member 64 by suitable means, the frame 70 extending upwardly from the main frame member 64 and to one side thereof and having a pair of generally parallel horizontally disposed rails 71 on its upper portion for movably supporting the carriage 10. The carriage has a plurality of wheels 73 which are adapted for engagement with the rails 71 to guide the carriage 10 therealong. A carriage drive connecting member 75 is provided to move the carriage along the length of the lead screw 16 and has a threaded opening 76 to receive the lead screw. The connecting member 75 is rigidly connected to a platform 78 having a generally horizontal portion 79 and an inclined portion 80 sloping from the carriage proper down under and to one side of the cylinder 5 in the assembled unit of the present invention. The horizontal portion 79 of the carriage platform 78 has a pair of vertical sides 81 spaced apart and slightly inclined outwardly, and a longer inclined side 82 which slopes steeply upward from portion 79 on the side away from cylinder 5. Side 82 acts as a chute for the deposit of glass fiber roving 23 or chopped glass fibers from a feeder or cutter 86 rigidly connected over the top of the chute 82 on a back side frame 89 comprising two inclined channels 90, an upper cross bar 91 and a pair of generally horizontally disposed parallel supporting arms 92.

As best seen in FIGS. 2 and 5, the roving 23 is deposited on the belt 12 by feeding the same through the feeder or cutter 86, the operation and details of this device being shown and described in copending application of John J. Nawalanic, Serial No. 22,891, filed April 18, 1960, now Patent No. 3,117,376, and assigned to the same assignee as the present invention. Using this device the operator can deposit continuous roving or chopped fibers or a mixture of the two on the belt 12. As particularly illustrated in FIG. 2, the cutter 86 is supported by the upper bar 91 and a strap 91a rigidly connected to one of the channels 90 and the cutter-feeder device 86. As seen in FIG. 5, the device 86 is provided with rollers 93 and 94, the lower roller 94 being a rubber-covered back-up roller and the upper roller 93 being a driven roller driven by motor 95, and having razor blades 96 disposed on one portion thereof only. Thus, glass fiber filler material 23 can be provided for use in the present invention by feeding roving 97 through rollers 93 and 94 on the left hand side of the cutter, as shown in FIG. 5, without being chopped, while part of the roving can be chopped in the center position, or all of the roving can be chopped when fed through the rolls in the extreme right hand position. In FIGURE 5, the continuous strands of fiber are illustrated by the numeral 23a, while the chopped fibers are illustrated by the numeral 23b.

A roving guide 98 is provided to guide the roving 97 through the feeder-cutter device 86, as also seen in FIG. 5. The guide 98 is manually movable and will remain in either one of three positions to provide, as above described, continuous strands of fiber, or chopped fibers, or both.

Further describing the details of the feeder-cutter device and as best seen in FIG. 2 or FIG. 1, the device 86 has a pair of side frame members 86a and 86b in which the rolls 93 and 94 are journaled. The side members 86a and 86b are like side members 13 and 14 in the previously mentioned copending application of John J. Nawalanic, Serial No. 22,891, filed April 18, 1960.

When the roving is fed through the rollers 93 and 94 without cutting, the individual strands thereof tend to spread apart as they fall down the chute 82 so that they are deposited upon the horizontal run of belt 12 in an open spaced but overlapping helical coil arrangement. This loose mat of spread strands makes excellent reinforcing filler material for the plastic binder.

Describing further the apparatus used to resurface cylinders and the like, a feed system is provided for carrying the belt 12 under the spray gun 22 and filler chute 82 and wrapping the material-laden belt around the cylinder 5. In the preferred embodiment shown in the drawings and as best seen in FIG. 2, the fibrous or other filler material 23 sliding down from chute 82 is deposited on belt 12 and sprayed with the liquid plastic binder 24 by the spray gun 22 just before the belt 12 is wrapped around the cylinder 5. The belt 12 is preferably a porous binder-impregnable woven cloth such as scrim—a porous coarse woven cloth used in the cloth industry as backing material for suit lapels, etc. The belt 12 is preferably fed from a supply roll 99 of scrim which is rotatably mounted in a generally horizontal position between the two supporting arms 92. The scrim is unwound from the feed roll 99 by the rotation of cylinder 5 and the scrim 12 passes through a 2-high bank of suitably mounted tension and guide rolls 100 and 101 from which it travels through its horizontal run 13 just prior to being wrapped around cylinder 5.

In a preferred embodiment of the present invention, the brake 20, which provides the necessary tension to belt 12, comprises a clamping collar having a generally circular portion 20a for frictionally engaging the shaft 100a upon which the upper roll 100 is rigidly mounted. A bolt 20b is provided to fasten the parallel flange portions 20c of the collar together. The bolt 20b can be tightened or loosened as desired to provide more or less friction on the shaft 100a and hence more or less tension on the belt 12 so that the same may be wrapped tightly around the cylinder as the carriage is progressively moved longitudinally thereof.

As seen in FIGS. 6, 7 and 8, one, two three or more layers of the filler-laden resin plus scrim material may be wrapped around the cylinder 5 depending upon the end result desired. This is adjusted by changing the drive of lead screw 16 which controls the speed of carriage 10 along rails 71. The apparatus in the present invention can be used to build up a predetermined thickness in one layer in one traverse of the carriage longitudinally of the cylinder 5 as shown in FIG. 8. The material will readily fill in to provide a solid film. However in some applications it is desirable to have two or three layers as illustrated in FIGS. 6 and 7. In precision applications particularly where new surfaces are being formed on pressure rollers and the like, the outer surface is hard and tough and can be ground to a desired outside diameter.

Having described the apparatus in detail, the novel method of resurfacing cylinders and rolls according to this invention will be briefly summarized. In preparing the apparatus for operation, the loose end of scrim 12 is fastened to the cylinder 5, the feeder-cutter 86 and spray gun 22 started and the motor 45 turned on with the proper setting on the variable speed selector 52 to wrap the cylinder with one or more layers of scrim.

As previously indicated, the present invention also provides a quick and economical method of making relatively thin walled hollow tubes by using a cylindrical member that is a collapsible mandrel 105 as illustrated in FIG. 9. The cylindrical mandrel 105 can be collapsed after it has been wrapped with the belt and its deposited filler and plastic binder, after the binder has set, leaving a hardened outer shell which is in the form of tubing. A parting agent such as talc or a silicone oil may be used to coat the surface of the mandrel 105 so the filler-binder material will not stick to the same.

As seen in FIG. 9, the mandrel 105 may comprise an outer rolled sheet 106 of metal or other suitable material having a generally cylindrical shape and being adapted for collapsing in which one longitudinally extending edge 107 of the rolled sheet 106 is moved radially inward, to a position shown in dotted lines, by the action of one or more interior supporting arms 108. To further describe that action, a plurality of axially spaced arms 108 (one only being shown) are pivotally supported on the interior side of edge 107 near the marginal edge at the radially outer end 108a thereof by means such as a pin 109 which is secured to the wall by a U-shaped block or clevice 110. The opposite radially inner end 108b of the arms 108 has restricted movement. A central hub 112 is provided with an inner member 113 having a slot 114 to restrict the movement of the end 108b of the arms. Hub 112 also has an outer elongated member having a semi-circular across section and having outer ends adjacent each end of slot 114 to provide a shoulder thereto to stop movement of arm 108. Thus, as seen in FIG. 9, the hub 112 has rigidly fixed bracing spokes 115 substantially equally spaced around the unflexed portion of the circumference of the rolled sheet 106, and one adjustable spoke being the movable arm 108 which can be moved to collapse the cylindrical form of sheet 106.

In the form of collapsible mandrel shown in FIG. 9, the arm 108 is moved manually to its position as illustrated in solid lines. A pin 117, fastened to the outer hub member 115 by a chain 118, is inserted into keyway 119 of the member 115 which, in the non-collapsible position of the mandrel, registers with keyway 120 of inner hub member 113, the inner hub member being rotatable within the outer hub member 115.

Thus the sheet 106 is cylindrical in shape, the arm being in its extended position. When desired, the mandrel can be collapsed by removing pin 117 from keyways 119 and 120 by rotating the hub counter-clockwise until a second keyway 122 on the inner hub member 113 registers with keyway 119. The pin may then be inserted into keyways 119 and 112 to prevent rotation of the inner hub member with respect to the outer hub member and keep the mandrel and arm 108 in its collapsed position as illustrated by dotted lines in FIG. 9. After the edge 107 of the rolled sheet 106 moves radially inwardly to the collapsed position shown in dotted lines, the hardened outer shell formed from the layers of filler-laden and resin-impregnated scrim material can be withdrawn from the exterior of the cylindrical member 106.

The preferred filler of the present invention is glass fibers in the form of continuous roving or in chopped pieces of roving as previously indicated. Other fillers may be used such as natural and artificial fibers including asbestos fibers, coconut shell fibers, cellulose fibers, cotton fibers, wool fibers, nylon fibers and metal fibers and mixtures thereof. While the above mentioned fiber glass and other fibrous fillers are generally used, other finely divided (generally 20 mesh to 325 mesh) fillers such as minerals including vermiculite, perlite and wollastinite (having needle-like particles), and inorganic fillers including carbon, silica, silica gel and diatomaceous earth can be used.

For use as a matrix for the filler, suitable plastic binding materials capable of impregnating belt 12, may be used such as thermosetting resins including phenol-formaldehyde, melamine-formaldehyde, polyester and thermoplastic resins including polyesters, polyvinyl acetate, and polystyrene. Other plastic binders including asphalt, tar, pitch and the like may also be used, particularly with fireproofing fibers such as asbestos with or without other fillers such as vermiculite to provide improved asphalt tubing.

Of the various combinations of filler and plastic binder that can be used advantageously such as the asbestos fiber-asphalt combination, the preferred combination is glass fibers and a catalyzed thermosetting polyester binder such as a condensation product of about equal moles of a glycol such as ethylene glycol and a mixture of dicarboxylic acids such as maleic and adipic acids, the polyester binder material being sprayed or otherwise applied on and around the glass fibers in a liquid form. The polyester is preferably dissolved in monomeric styrene or other vinyl monomer which will also cross link the polyester. The polyester material generally contains catalysts and accelerators for curing the polyester preferably at room temperature to provide a strong, tough, rigid, abrasion resistant and solvent resistant sleeve over the cylinder 5.

As previously indicated, the preparation of a surface that is three layers in thickness is shown in FIG. 6. Three layers are wrapped on the extreme left hand end of the cylinder as shown at 125 while handle 17a of the clutch 17 is in its idle position and the carriage is not moving longitudinally of the cylinder. Then, the carriage is moved along the cylinder as previously described and the scrim material wrapped along the length of the cylinder. When reaching the right hand end of the cylinder, the last layer may be cut at 126 by suitable means such as scissors or automatic shears. Layers that stick out beyond the ordinary three layer thickness can be easily machined off when dry and hard to make a smooth and uniform cylindrical surface.

In FIG. 7, the preparation of a surface having a thickness of two layers is shown. The method of wrapping is similar to that described for the three layer thickness in FIG. 6. However, the right hand end of the cylinder is wrapped as illustrated in FIG. 7 without cutting any scrim material by overlapping end layer 128 with a final end layer 129, the layer 129 being superimposed directly over layer 128 with the handle 17a and clutch 17 in the idle position. The extra material on the outer surface of the cylinder, including the left hand portion of layer 129, may be machined off to provide a uniform diameter for the cylinder throughout its length.

A surface having a thickness of one layer is shown in FIG. 8. On a single-ply basis, about 15 to 20 percent overlap is desirable to provide a uniform thickness. If the scrim material is about 12 inches wide, the fiber-laden resin material is preferably deposited on the center portion of the scrim with an overlap of at least one or two inches on each marginal edge of the scrim to prevent spillage and loss of the filler-laden resin. While the thickness of the resin/scrim material may be greater in the center than on the marginal sides, wrapping the material under tension generally levels out the composite layer formed by the resin and scrim.

In accordance with the present invention, when the diameter of the cylinder is about 24 inches and the width of the scrim is about 12 inches, a build-up of about $\frac{1}{16}$ inch per wrap provides the best results from the standpoint of release of any entrapped air, getting complete wet-out, and getting no drain-off or run-off.

Continuing to describe the preferred embodiment shown in the drawings, generally a weight of about 6 to 8 pounds per minute of fiber-resin material provides the best cylindrical articles, the weight of fiber in the above fiber-resin mixture being preferably about 25 to 30 percent of the total.

It is to be understood that in accordance with the provisions of the patent statutes, the particular form of product shown and described and the particular procedure set forth are presented for the purposes of explanation and illustration and various modifications of said product and procedure can be made without departing from the invention.

What is claimed is:

1. A method of making a relatively thin walled hollow tube on a cylinder and of providing a new outer surface for a cylinder, the method comprising the steps of rotating said cylinder, moving a carriage longitudinally thereof, feeding an impregnatable belt from said carriage toward the cylinder for pressive wrapping thereof, applying impregnating flowable plastic material between said belt and said cylinder, permanently wrapping said cylinder with the impregnatable belt to provide an outer layer on said cylinder, placing said belt in tension during said wrapping, and hardening said plastic material to form around said cylinder a solid outer shell having an inner portion of hardened plastic and an outer portion of said impregnated belt.

2. A method of making a relatively thin walled hollow tube on a cylinder and of providing a new outer surface for a cylinder, the method comprising the steps of permanently wrapping said cylinder progressively with a flexible belt of impregnatable porous woven cloth, placing said belt in tension during said wrapping, applying a mixture of glass fibers and a solidifiable impregnating resin between said belt and said cylinder, and solidifying said plastic to form around said cylinder a solid, hard outer shell having an inner portion of a mixture of solidified resin and glass fibers and an outer portion of the impregnated belt.

3. The method of forming an outer layer on a mandrel comprising the steps of permanently and progressively wrapping a solidifiable plastic-impregnatable belt around and along said mandrel, applying continuously between said mandrel and said belt a combination of said solidifiable plastic material and a filler, maintaining tension on said belt during said wrapping operation to compress said plastic material and filler against the mandrel effective to provide a unitary layer having said impregnated belt as an outer skin portion, and collapsing said cylindrical member to provide a hollow generally cylindrical tube.

4. An apparatus comprising a rotatable cylindrical member, a carriage mounted for movement longitudinally of said cylindrical member, means on said carriage for feeding a flexible resin impregnatable belt toward the cylindrical member, means for rotating said cylindrical member and moving the carriage longitudinally thereof, means for permanently wrapping said belt progressively around said cylindrical member, belt-tensioning means movable with said carriage for placing said belt in tension to tightly wrap said belt around the cylindrical member, and means movable with said carriage for depositing a solidifiable plastic material on the cylindrical member between said belt and said cylindrical member.

5. An apparatus comprising a rotatable cylindrical member, a carriage mounted for movement longitudinally of said cylindrical member, means on said carriage for supplying a flexible porous resin impregnatable belt member for movement toward said cylindrical member, including a supply roll of said belt member and a guide roll, means for rotating said cylindrical member and for moving said carriage longitudinally thereof, means for permanently wrapping said belt member progressively around the cylindrical member, brake means for placing a drag on said belt member for tight wrapping said cylindrical member, said brake means effective to restrict the rotation of one of said rolls to thereby apply tension forces to said belt member, means movable with said carriage for depositing a filler material on the surface of said belt member wrapped next to said cylindrical member, and means movable with said carriage for depositing a flowable and settable synthetic resin on said belt member mixed with said filler material.

6. An apparatus as defined in claim 5 wherein said cylindrical member is collapsible, and there is also provided means for collapsing said cylindrical member to thereby leave a hollow generally cylindrical tube comprising an inner portion of the solidified plastic material and an outer portion of the impregnated belt.

References Cited by the Examiner

UNITED STATES PATENTS

| | | | |
|---|---|---|---|
| 1,979,656 | 11/1934 | Whitman | 156—425 XR |
| 2,363,967 | 11/1944 | Jasper | 138—140 |
| 2,503,041 | 4/1950 | Greene | 156—446 XR |
| 2,552,599 | 5/1951 | Stout | 138—140 |
| 2,614,058 | 10/1952 | Francis | 154—83 |
| 2,649,133 | 8/1953 | Just | 156—213 |
| 2,814,329 | 11/1957 | Sitton | 156—429 XR |
| 2,854,059 | 9/1958 | Palmer | 156—510 XR |
| 2,877,150 | 3/1959 | Wilson | 154—83 |
| 2,906,317 | 9/1959 | Keyes | 156—371 XR |
| 2,941,570 | 6/1960 | Plym | 156—443 XR |
| 3,006,402 | 10/1961 | Ferla | 156—443 |
| 3,012,923 | 12/1961 | Slayter | 156—372 XR |

FOREIGN PATENTS 525,430   5/1956   Canada.

EARL M. BERGERT, *Primary Examiner.*

EDWARD V. BENHAM, *Examiner.*

L. G. FOSTER, P. DIER, *Assistant Examiners.*